United States Patent Office 3,538,136
Patented Nov. 3, 1970

3,538,136
INORGANIC ALUMINUM-OXYGEN-PHOSPHORUS BOND POLYMERS
Donald L. Schmidt and Edward E. Flagg, Midland, Mich., assignors to The Dow Chemical Company, Midland, Mich., a corporation of Delaware
No Drawing. Filed Feb. 2, 1967, Ser. No. 613,413
Int. Cl. C07f 5/06
U.S. Cl. 260—448                                12 Claims

ABSTRACT OF THE DISCLOSURE

This invention is concerned with novel inorganic polymers based on aluminum, oxygen and phosphorus wherein there is aluminum-oxygen-phosphorus bonding. The polymers are prepared by reacting an aluminum source material, e.g., an aluminum hydride or aluminum alkyl or corresponding partially halogen substituted aluminum alkyl reactant, with a phosphonic and/or phosphinic acid. The polymers are particularly suitable for use as surface coatings, heat shields, etc., in applications requiring heat stability at elevated temperatures in that these do not decompose or detrimentally degrade even at high temperatures.

BACKGROUND OF THE INVENTION

The present invention is related to inorganic polymers and more particularly is concerned with novel aluminum-oxygen-phosphorus bond containing polymers and to a method for their preparation. The term "inorganic polymers" as used herein is in accordance with generally accepted definition which defines such materials as not containing any carbon in the polymer backbone, i.e., chain.

To date, the most widely known inorganic polymers are the silicones which are based on linear chains of alternating silicon-oxygen bonds.

Additionally, network structures of aluminum-oxygen-phosphorus have been prepared by the reaction of orthophosphoric acid and aluminum oxide (H. H. Greger, U.S. 2,460,344; Callis et al., Chem. Revs. 54, 777 (1954)). The product of reaction from these components is a viscous fluid which can be dried to an amorphous material believed to be a three-dimensional network of Al—O—P chains. These phosphate materials have been used as insulating coatings and as binders (Eubanks et al., NASA Tech. Note D-106, Nov. 1959). Also, they are alleged to have some application at temperatures up to 3500° F.

Several papers have been presented reporting attempts to prepare polymer chains which include aluminum, oxygen and phosphorus atoms. One is directed to the reaction of butylmethyl phosphonochloridate with aluminum tributoxide. (Andrianov et al., J. Polymer Sc., 30, 513 (1958)). A second paper by the same authors is directed to the reaction of aluminum isopropoxide with dialkyl esters of methylphosphonic acid. (Andrianov et al., Izv. Akad. Nauk SSSR, Otd. Khim. Nauk, 1753 (1962); C.A. 58, 7965). Also, the reaction of aluminum isopropoxide with trialkyl esters of phosphonic acid has been published (Andrianov et al., Izv. Akad. Nauk. SSSR, Ser. Khim., (9) 1660 (1963); C.A. 58, 15165).

However, the products resulting from the reactions carried out by Andrianov et al. all had low degrees of polymerization and mixtures were obtained in substantially all of the preparations.

Additionally phosphorus-oxygen-metal double-bridged polymers of structures corresponding to

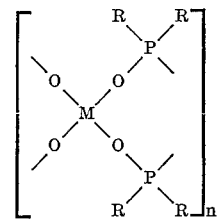

have been reported [Block et al., J. Am. Chem. Soc. 84, 3200 (1962); Crescenzi et al., J. Am. Chem. Soc. 87, 391 (1965); Montermoso, Rubber Chem. Technol., 34, 1521 (1961)]. M is a metal and R represents organic aliphatic or aryl groups. In these compositions the metal M is tetrahedral in configuration having two primary valence bonds and two coordination bonds, zinc (II) and cobalt (II) specifically are discussed as the metals employed. The polymers reported in the journal articles listed directly hereinbefore are prepared by reacting a divalent metal chloride, such as zinc (II) chloride and cobalt (II) chloride, and phosphinic acids.

SUMMARY

The present invention comprises reacting a Group III metal source material, other than boron, in the form of the metal hydride or metal alkyl with phosphonic and/or phosphinic acids in an inert solvent at a maximum temperature of about room temperature and ordinarily at a maximum of about zero degrees centigrade and recovering a solid metal-oxygen-phosphorus linked polymeric product therefrom. Aluminum is a preferred metal source material. The polymer is characterized in that the Group IIIa metal source material, e.g. aluminum, forms three primary valence bonds therein. Further, depending on the acid source material, the aluminum in the polymeric configuration exhibits 0, 1, 2 or 3 coordination bonds and coordination number of 3, 4, 5 or 6. It should be understood that in the polymeric products, the aluminum-oxygen bonds are substantially equivalent to one another, i.e. the bonds are of substantially the same length. Conformity with conventional descriptive practice in the chemical arts, however, requires that aluminum be depicted with only three "primary" valence bonds (simple dashes); the remainder of the bonds being coordination bonds (arrows).

It is a principal advantage of the present invention to provide novel relatively long-chain inorganic polymers suitable for use at temperatures higher than applicable with organic polymers now available.

The present novel polymers are particularly suitable for use as surface coatings, heat shields, etc., in applications requiring heat stability at elevated temperatures in that these do not decompose or detrimentally degrade even at high temperatures.

DESCRIPTION OF THE PREFERRED EMBODIMENTS

More particularly the novel polymer of the present invention is prepared by reacting an etherated aluminum hydride or aluminum alkyl with phosphonic and/or phosphinic acids at a maximum temperature of about minus 70° C. In this process, usually the reactants are employed in about stoichiometric quantities required for preparation of a predetermined embodiment of the polymer product.

The term "aluminum hydride" as used herein includes aluminum hydride and halogenated aluminum hydrides in ether solvated form. For convenience, sometimes hereafter these will be designated by the formula $AlH_{3-n}X_n$ where X represents halogen and $n$ is either 0, 1 or 2. The term "aluminum alkyl" includes both aluminum trialkyls and aluminum haloalkyls corresponding to the general formula $AlR_{3-n}X_n$ where R is an aliphatic alkyl group having a carbon chain length of from 1 to about 4, X is halogen and $n$ is 0, 1 or 2. Ordinarily, the halogen is chlorine. Different halogen atoms can be present in the same molecule.

Phosphonic acids [R'OP(OH)$_2$], depicted structurally as

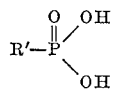

and phosphinic acids [R''R'''OPOH], depicted in structural form as

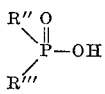

which can be employed in the practice of the present invention are those acids wherein R', R'' and R''' are aliphatic alkyl, aryl, and alkaryl groups or the corresponding substituted groups, e.g., halogen substituted, wherein the number of carbons present in each of the R', R'' and R''' groups ranges from 1 to about 12. Examples of suitable phosphonic and phosphinic acids for use in the practice of the present invention are phenylphosphonic acid

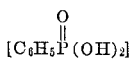

methylphosphonic acid

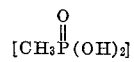

diphenylphosphonic acid

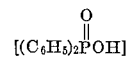

n-butylphosphonic acid

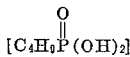

n-octylphosphonic acid

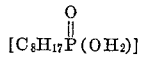

di-n-dodecylphosphinic acid

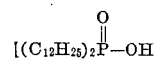

di-n-hexylphosphinic acid

and the like.

Ethers ordinarily are employed as the solvent for the reactants. Diethyl ether, n-dipropyl ether, iso-dipropyl ether, tetrahydrofuran (THF) and the like are examples of suitable solvent materials. The listed solvents are particularly useful since the aluminum-oxygen-phosphorus linked polymer, as formed, precipitates directly in the reaction medium and the solvent is readily removed therefrom.

The actual preparation of the present novel polymer is carried out by agitating an ethereal solution of the reactants at a predetermined temperature. Conveniently, one of the reactants in solution is added slowly to a stirred solution of the second reactant over a period of time, the polymer precipitating directly in the reaction mass. Usually, to assure completion of the reaction, the reaction mixture is stirred or agitated for an additional period of time, e.g., from several minutes up to an hour or more following the completion of the mixing of the reactants.

The solution concentrations to be used are not critical. Maximum concentrations ordinarily are those such that the reactant is completely dissolved therein at the operating conditions. Extremely dilute solutions are somewhat undesirable in that they are unwieldy to handle, require large storage and processing equipment and can make the separation of the solid product a time-consuming operation. For most operations, reactant solutions ranging in concentration from about 0.001 to about 0.1 molar with respect to the reactant solutes are used.

For optimum product yield and purity, all processing operations, including the initial solution preparation, are carried out in a substantially anhydrous, inert atmosphere, e.g., nitrogen or argon. Also, all reactants and solvents preferably are dried so as to be substantially anhydrous prior to use in the process.

By preselecting the aluminum source material and acid from those operable materials disclosed herein, it is an unexpected advantage of the present invention that polymeric products of specific composition and characteristics can be prepared. Additionally, it has been found that certain of the novel products of the invention can be further reacted with either phosphonic or phosphinic acid moieties or a halogen source such as a hydrogen halide, for example, to prepare other new and useful embodiments of the aluminum-oxygen-phosphorus bond containing polymers.

In general, the polymer is prepared in one of five configurations, these being structurally designated as follows:

Type I

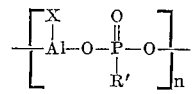

Type II

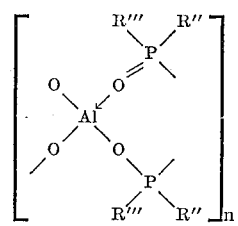

Type III

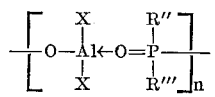

Type IV

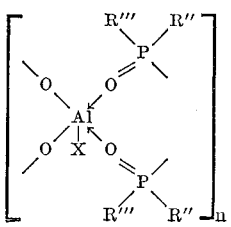

Type V

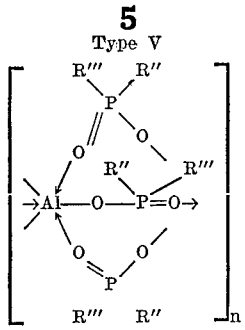

In the depicted formulas for these polymer configurations, the group designations X, R', R'', and R''' are as indicated hereinbefore. The letter $n$ represents an integer greater than 1. Preferably X is a coordinating member selected from the group of chlorine, bromine, iodine, hexafluoroacetylacetone and the like. The halogens and particularly chlorine, usually are employed.

In these various polymeric configurations, aluminum exhibits 1 coordination bond in the Type II or III materials, two or three coordination bonds in the Type IV polymer and three coordination bonds in the Type V polymer. The coordination number of aluminum in the Type I, II and IV products is 3, 4, 5 or 6. The aluminum in the Type III polymer exhibits a coordination number of 4 and in the Type V composition has a coordination number of 6.

In addition to these polymer configurations, copolymers can be prepared exhibiting alternating monomeric units of Type I or Type III materials, for example.

The actual preparation of a predetermined type of the polymer is illustrated by the following examples. In these preparations, it is understood that the reaction actually is carried out in the presence of an inert solvent and within the disclosed temperature range. For ease of presentation, only the active reactants will be shown.

PREPARATION OF TYPE I POLYMER

Aluminm dihydrogen monohalide or aluminum dialkyl monohalide and a phosphonic acid can be reacted, preferably in about stoichiometric quantities, to prepare Type I polymer

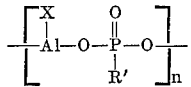

directly.

Alternatively, aluminum hydride or an aluminum trialkyl can be reacted with a phosphonic acid and the resulting polymeric intermediate then can be reacted with an equimolar quantity of a halogen halide to produce the Type I material.

PREPARATION OF TYPE II POLYMER

Aluminum hydride, aluminum dihydrogen halide, aluminum trialkyl or aluminum dialkyl monohalide is reacted with an equimolar quantity of a phosphinic acid to prepare an aluminum dialkyl phosphinate. This intermediate is treated, usually directly in the reaction vessel, with a phosphonic acid and the reaction mass heated to prepare Type II polymer,

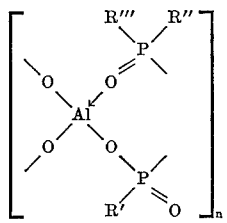

In a second procedure, Type I polymer can be reacted with a phosphinic acid and the product mixture heated to produce the Type II polymer.

PREPARATION OF TYPE III POLYMER

An aluminum monohydrogen dihalide (AlHX$_2$) or aluminum monoalkyl dihalide (AlRX$_2$) is reacted with a phosphinic acid to produce Type III polymer having an apparent structure,

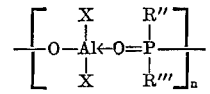

Aluminum hydride of aluminum trialkyl can be reacted with a phosphinic acid and the resulting product mixture in turn contacted with a minimum of two molar equivalents of a hydrogen halide to produce Type III polymers.

PREPARATION OF TYPE IV POLYMERS

Monohalogen substituted aluminum hydride or aluminum alkyl when reacted with two molar equivalents of a phosphinic acid provides Type IV polymer,

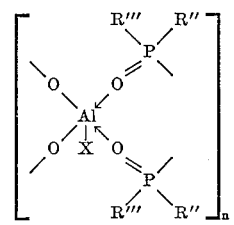

Similarly nonsubstituted aluminum hydride or aluminum alkyl can be reacted with two molar equivalents of a phosphinic acid and the resulting intermediate treated with a hydrogen halide to prepare the Type IV polymeric material.

PREPARATION OF TYPE V POLYMER

In the preparation of Type V polymeric structure, a nonsubstituted aluminum source material is reacted with three molar equivalents of a phosphinic acid to give a product having a phosphinic group in place of the halogen (X) in the lattice structure of the Type IV material. This can provide a double spirane type structure with eight member rings having the following configuration.

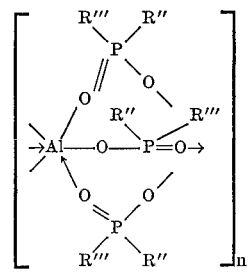

The following examples will serve to further illustrate the present invention but are not meant to limit it thereto.

PREPARATION OF TYPE I POLYMER

Example 1.—Aluminum dihydride monochloride solvated with tetrahydrofuran, corresponding to the formula AlH$_2$Cl·2(THF), was prepared by slowly adding a solution of about 1.9 grams (0.05 gram mole) of recrystallized lithium aluminum hydride (LiAlH$_4$) in 250 milliliters diethyl ether to a solution of about 6.7 grams (0.05 gram mole) of resublimed AlCl$_3$ in 250 milliliters diethyl ether. The resulting product mixture was filtered to remove the precipitated lithium chloride therefrom and the resulting clear solution added to 250 milliliters of substantially anhydrous tetrahydrofuran. The resulting tetrahydrofuran-diethyl ether solution of AlH$_2$Cl·2THF was slowly added over a six-hour period to about 15.8 grams (0.10 gram mole) of phenylphosphonic acid,

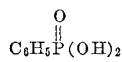

in 500 milliliters of substantially anhydrous tetrahydrofuran. A Dry Ice bath was used to cool the phenylphosphonic acid solution during the addition of the hydride solution. After the addition was completed, the reaction mixture was allowed to warm to room temperature and then refluxed for about 18 hours. The resulting product mixture was filtered and a white solid product recovered.

This solid product was dried at room temperature under an absolute pressure of about 0.01 mm. Hg pressure and yielded about 3.7 grams of dry material. The solvent was removed from the residual filtrate at a reduced pressure and additional white solid product obtained. This product, weighing about 21.3 grams, was dried at about 0.01 mm. Hg pressure at room temperature for about 16 hours.

Elemental anlysis of the resulting product gave Al—10.22%; C—39.27%; Cl—13.35%; H—4.24%; P—11.11%. The calculated analysis for a Type I polymer having repetitive monomeric units of

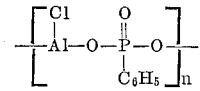

and which had associated therewith about 0.67 mole of tetrahydrofuran for each monomeric unit is Al—10.22%; C—39.05%; Cl—13.28%; H—3.91%; P—11.61%.

Characterization of the solid product was carried out as follows:

The molecular weight of the product as determined ebulliometrically in ethanol was about 890. This material was soluble in tetrahydrofuran (THF), ethanol and dimethylformamide (DMF). It did not appear to react with water; a dimethylformamide solution could be mixed with water to give a clear solution.

The infrared spectrum of this material showed bands at 1152, 1095 and 1072 cm.$^1$. There were also bands at 1589, 1439, 1029, 1000 and 699 cm.$^{-1}$, which are typical of phenyl groups substituted on a phosphorus atom.

A thermogravimetric analysis (TGA) run under nitrogen indicated that the material lost THF starting at about 75° C. A sample of product desolvated at 100° C. at 0.01 mm. gave a TGA curve that indicated a weight loss at 540° C. of only about 10%. The TGA curve up to 540° C. is essentially straight. At about 550° C. the decomposition rate increases.

A differential thermal analysis (DTA) of the desolvated product indicated no exotherms or endotherms up to 475° C., the limit of the particular instrument used.

Example 2.—Using the same general procedure and technique as described in Example 1, about equimolar amounts of methylphosphonic acid (0.010 gram mole) and AlH$_2$Cl·2THF (0.010 gram mole) were reacted at about minus 30° C. The resulting solid product obtained from this preparation was substantially insoluble in polar organic solvents and water. It was infusible up to about 500° C. The infrared analysis was consistent with the proposed Type I polymer structure. Elemental chemical analysis gave Al—14.1%; P—16.2%; H—3.63%; Cl—18.4%. Calculated for a Type I polymer with a monomeric unit of

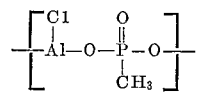

having associated therewith 0.5 gram mole of tetrahydrofuran is Al—14.1%; P—16.8%; H—3.74%; Cl—17.5%.

Example 3.—The general procedure described in Example 1 was used to react, at about minus 70° C., substantially equimolar quantities of phenylphosphonic acid (0.015 gram mole) and aluminum hydride etherate (0.015 gram mole). Hydrogen was evolved from the reaction mass. Hydrogen fluoride (HF) in excess of that required stoichiometrically was bubbled through the reaction mixture at the indicated temperature. Following the HF addition, the solution was warmed to about 70° C. and refluxed for about one day. A white solid product resulted which was separated from the residual reaction mixture.

The product was substantially insoluble in THF and infusible up to a temperature of about 600° C.

X-ray diffraction analysis indicated the solid product was amorphous. Infrared analysis showed the product contained phenyl-phosphorus and phosphorus-oxygen bonds and thereby was consistent with the assigned structure.

Elemental chemical analysis gave Al—9.34%; P—12.7%; F—7.38%. Calculated analysis for a Type I polymer having monomeric units of

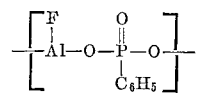

and 1.2 moles of tetrahydrofuran per unit is Al—9.34%; P—10.7%; F—6.58%.

The solvated material indicated a weight loss of less than 23% at 600° by TGA.

A second preparation was carried out at minus 75° C. using n-butylphosphonic acid instead of phenylphosphonic acid. The resulting solid product was insoluble in water but soluble in acid solutions. X-ray diffraction analysis showed the material was amorphous. The product was infusible up to 500° C. where charring became extensive. Elemental chemical analysis gave Al—9.47%; P—12.9%; F—8.0%. Calculated analysis for a Type I polymer having monomeric units of

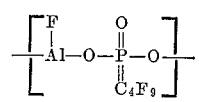

and 1.4 mole of tetrahydrofuran associated therewith per monomeric unit is Al—9.53%; P—10.93%; F—6.71%.

n-Octylphosphonic acid and aluminum hydride etherate in substantially equimolar quantities (0.01 gram mole each) and an excess of hydrogen fluoride were similarly reacted at about minus 70° C. to produce a solid product that was soluble in tetrahydrofuran. This product was amorphous and infusible. Infrared analynis showed bonding consistent with a Type I polymer.

Elemental chemical analysis gave C—41.0%; H—7.45%; Al—8.64%; P—11.5%; F—5.32%. Calculated for a polymer having a monomeric unit

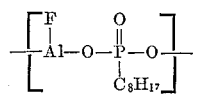

and 1.4 moles tetrahydrofuran per unit associated therewith is C—43.2%; H—7.63%; Al—10.1%; P—11.6%; F—7.12%.

PREPARATION OF TYPE II POLYMER

Example 4.—About equimolar quantities (0.010 gram mole) of diphenylphosphinic acid,

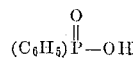

and aluminum hydride diethyl etherate were admixed by adding the acid to a diethyl ether-tetrahydrofuran solution of the aluminum hydride etherate at about minus 70° C. Following the completion of the phosphinic acid addition, about 0.01 gram mole of methylphosphonic acid was added to the reaction mixture. A white, solid product exhibiting a low solubility in tetrahydrofuran and dimethylformamide was obtained. This material was shown by X-ray diffraction analysis to be amorphous. Upon heating the product to 500° C., the solid melted. This melting point was observed both in air and in nitrogen when determined by differential thermal analysis. On cooling, the product solidified into a hard, clear, colorless, solid which had a unique crystalline pattern when analyzed by X-ray diffraction technique.

Elemental chemical analysis indicated C—47.47%; H—3.93%; Al—7.14%; P—16.65%. Calculated analysis for a polymer having a monomeric unit corresponding to

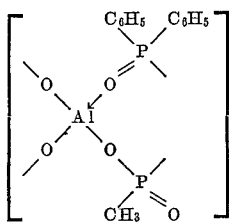

is C—48.47%; H—4.07%; Al—8.37%; P—19.23%.

The infrared analysis was consistent with the proposed structure.

The preparation of this polymer was repeated by first reacting methylphosphonic acid with AlH₂Cl·2THF followed by adding diphenylphosphinic acid to the reaction mixture. The resulting reaction mass was refluxed to drive off hydrogen chloride. The physical properties of solid product obtained together with infrared and elemental analysis indicated this product was the same as shown directly hereinbefore. This product melted at 500° C. and upon cooling was found by X-ray diffraction analysis to possess a crystalline structure identical to the product of the alternate procedure.

Example 5.—The procedures described in Example 4 were repeated using phenylphosphonic acid, diphenylphosphinic acid and AlH₂Cl·2THF as reactants.

The solid polymeric product obtained was found to melt (in a nitrogen atmosphere) between about 480–540° C. This material dissolved with swelling in dimethylformamide. The initial product was amorphous, but after fusion a crystalline pattern was observed by X-ray diffraction. The infrared analysis was consistent with the proposed structure. Elemental analysis for the polymer having a monomeric unit corresponding to the empirical formula C₁₃H₁₅AlO₅P₂ is C—54.02%; H—3.78%; Al—6.74%; P—15.47%. Actual analysis showed C—54.00%; H—4.40%; Al—5.22%; P—13.09%.

Example 6.—About equimolar quantities (0.01 gram mole) of methylphenylphosphinic acid, aluminum hydride diethyletherate and n-octylphosphonic acid were reacted following the first procedure set forth in Example 4. The resulting polymer melted over a range of between 350–405° C. Remelting the product after solidification showed the same melting characteristics. The solid product after melting was a waxy solid. Before fusing, the polymer was found to be amorphous and soluble in dimethylformamide. After fusion, the product exhibited a crystalline pattern as determined by X-ray diffraction analysis and was substantially insoluble in dimethylformamide.

Thermogravimetric analysis indicated a weight loss of only about 2.5 percent at 500° C. This thermal stability is consistent with the proposed polymer structure.

Elemental chemical analysis showed C—51.0%; H—7.60%; Al—3.67%; P—13.70%. Calculated theoretical analysis for a polymer having a monomeric unit

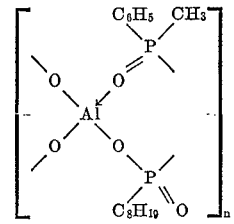

with one molecule of tetrahydrofuran bonded thereto is C—51.12%; H—7.45%; Al—6.04%; P—13.87%.

This procedure was repeated using di-n-dodecylphosphinic acid as the phosphinic acid reactant.

After the residual tetrahydrofuran was removed from the sticky, viscous product of this reaction, an amorphous, wax-like solid was obtained which was substantially insoluble in tetrahydrofuran. The polymer melted between about 250–312° C. and after fusion was found by X-ray diffraction analysis to have a crystalline structure.

Elemental chemical analysis gave C—60.80%; H—10.81%; Al—3.50%; P—9.78%. Theoretical calculated analysis for a Type II polymer having a mono- following the technique described for the first preparation in Example 4 using two different phosphinic acids and n-octyl phosphonic acid.

In the first of these preparations, equimolar proportions of a mixture of diphenyl phosphinic and methylphenylphosphinic acids was used as the phosphinic acid reactant.

The resulting polymer was a waxy solid which melted between 280 and 350° C. and which upon cooling solidified into a clear waxy glass. The initial product from the reaction showed broad X-ray bands at 12–16 A., 4.4–6.6 A. and 3.85–4.0 A. The same bands were present after fusion except they were somewhat sharper.

A partial elemental analysis showed C—50.5%; H—8.10%. Theoretical calculated analysis for a monomeric unit of the proposed structure is C—50.84% and H—8.29%.

A second preparation was carried out using a mixture having 2:1 molar proportions of diphenylphosphinic acid and di-n-dodecylphosphinic acid as the phosphinic acid source. The resulting polymer obtained from this preparation melted between about 280° C. and 310° C. The product was a flexible waxy solid which showed X-ray bands at 14–20 A. and 4.4–4.7 A. both before and after fusion.

Elemental analysis showed C—56.30% and H—10.21%. Calculated for a Type II polymer of repetitive monomeric units is C—56.75% and H—9.99%.

These hybrid polymers prepared using a mixture of phosphinic acids exhibited a somewhat reduced melting point and an increased flexibility over the Type II products prepared using a single phosphinic acid.

PREPARATION OF TYPE III POLYMER

Example 8.—About 100 milliliters of an 0.1 molar solution of diphenylphosphinic acid in tetrahydrofuran was slowly added to 100 milliliters of an 0.01 molar solution of AlHCl₂ in tetrahydrofuran at a temperature of about minus 78° C. Following completion of mixing of the reactants, the tetrahydrofuran solvent was removed.

A solid product remained which melted to a viscous liquid at 70° C. The product was soluble in tetrahydrofuran. Molecular weight of the polymeric product as determined by ebulliometric technique in tetrahydrofuran was found to be from about 1700 to about 2200.

The infrared spectrum was consistent with the proposed structure.

Elemental chemical analysis showed C—49.10%; H—4.58%; Al—6.60%; Cl—18.20%; P—8.14%. Theoretical analysis for a Type III polymer having a monomeric unit, corresponding to the empirical formula $C_{12}H_{10}AlCl_2PO_2$, with a molecule of tetrahydrofuran attached to each monomeric unit is C—49.64%; H—4.69%; Al—6.98%; Cl—18.31%; P—8.00%.

PREPARATION OF TYPE IV POLYMER

Example 9.—Di-n-hexylphosphinic acid (0.02 gram mole) and aluminum monochlorodihydride ditetrahydrofuranate (0.01 gram mole) were admixed and reacted in THF solvent at −70° C. The solid product which was recovered was very soluble in tetrahydrofuran. The product melted between about 360–400° C. The solid polymer was a pliable, waxy material which upon X-ray diffraction analysis was found to be crystalline. The molecular weight as determined by ebulliometry in tetrahydrofuran was about 3200.

Elemental analysis for carbon and hydrogen showed C—55.05%; H—9.93%. Calculated theoretical analysis for a Type IV polymer having a monomeric unit corresponding to the empirical formula $C_{24}H_{52}P_2O_4AlCl$ is C—54.49%; H—9.91%.

Example 10.—About 0.01 gram mole of etherated aluminum hydride and 0.02 gram mole of di-n-octylphosphinic acid were reacted at about minus 70° C. in THF solvent. The resulting product mixture after agitation for about half an hour was heated to about 70° C. and an excess of gaseous hydrogen fluoride bubbled therethrough. Removal of the solvent gave a solid product which melted between 210–270° C. and gave a material resembling beeswax in consistency upon cooling. The solid polymeric proudct was only partially soluble in tetrahydrofuran and X-ray diffraction analysis indicated it was crystalline.

Elemental analysis gave C—60.0%; H—11.08%; Al—4.17%; F—2.23%; P—9.11%. Calculated analysis for a Type IV polymer having a monomeric unit corresponding to the formula $C_{32}H_{68}AlFO_4P_2$ is C—61.61%; H—10.97%; Al—4.32%; F—3.04%; P—9.91%.

Example 11.—Following the procedure set forth in Example 10, diphenyl phosphinic acid was utilized as the phosphinic acid reactant.

The resulting solid product was substantially insoluble in tetrahydrofuran and melted above 465° C. The original product and the solidified mass after fusion both were shown by X-ray diffraction to be crystalline.

Elemental analysis showed C—58.75%; H—4.40%; P—12.13%. Calculated theoretical analysis for a Type IV polymer having a monomeric unit corresponding to the empirical formula $C_{24}H_{20}AlFO_4P_2$ is C—59.99%; H—4.20%; P—12.89%.

PREPARATION OF TYPE V POLYMER

Example 12.—About 0.015 mole of di-n-hexylphosphinic acid and 0.015 mole of di-n-octylphosphinic acid were dissolved in tetrahydrofuran. The resulting solution was cooled to about minus 70° C. in a Dry Ice-acetone bath. About 0.01 mole aluminum hydride dissolved in tetrahydrofuran was slowly added to the acid solution with mixing. After the hydride solution addition was complete, the reaction mass was slowly warmed to room temperature. The solvent was removed by heating; as the solvent was taken off, a semi-rubber-like product remained in the reaction vessel.

This product swelled in a variety of polar and nonpolar organic solvents, but was substantially insoluble in all common organic liquids generally employed as solvents.

The product melted at about 300–310° C.

X-ray diffraction analysis showed the product possessed a crystalline structure.

Elemental chemical analysis gave C—62.25%; H—11.00%. Calculated analysis for a Type V polymer with monomeric units corresponding to the empirical formula $C_{42}H_{90}P_3O_6Al$ is C—62.20%; H—11.19%.

In a second study utilizing the same procedure about three moles of di-n-octylphosphinic acid was reacted with one mole of aluminum hybride in tetrahydrofuran.

The resulting product was a flexible film having some rubber-like properties but possessing relatively low tensile strength. The film was partially soluble in THF. The polymer was found by X-ray diffraction analysis to be crystalline. It melted at about 290° C.

Elemental analysis showed C—62.70%; H—11.06%; Al—3.03%; and P—9.51%. Theoretical calculated analysis for a Type V polymer having monomeric units of empirical formula $C_{48}H_{102}AlO_6P_3$ is C—64.60%; H—11.48%; Al—3.01%; and P—10.38%.

PREPARATION OF COPOLYMERS HAVING ALTERNATING TYPE I AND TYPE III MONOMERIC UNITS

Example 13.—About 0.02 mole of di-n-hexylphosphinic acid, 0.02 mole of di-n-heptylphosphinic acid and 0.01 mole of n-octylphosphonic acid were dissolved in tetrahydrofuran and cooled to about minus 70° C. in a Dry Ice-acetone bath. About 0.02 mole of aluminum hydride in tetrahydrofuran was added to the cold acid solution with agitation. Following the hydride addition, stirring was continued, and the reaction mixture was permitted to warm to ambient temperature. The mixture was then heated to reflux temperature and the solvent removed therefrom.

A flexible film-like product was produced. This material melted at from about 315 to about 320° C. and had a crystalline structure.

Elemental analysis gave C—58.15%; H—10.70%. Calculated theoretical analysis for a polymer having alternating repetitive Type I and Type III monomeric units with an empirical formula of $C_{60}H_{129}Al_2O_{11}P_5$ is C—58.33%; H—10.52%.

In a second study utilizing the same procedure, di-n-hexylphosphinic acid, phenylphosphonic acid and aluminum hydride were reacted in tetrahydrofuran solvent using a phosphinic acid/phosphonic acid/aluminum hydride mole ratio of 4/1/2.

The polymeric product recovered was found to be substantially insoluble in the common organic liquids used as solvents. The product melted between about 320—365° C. When cooled after melting, the polymer was a brittle wax that was crystalline according to X-ray diffraction analysis.

Elemental chemical analysis gave C—55.7%; H—9.49%; Al—3.33%. Calculated analysis for the copolymer which had a monomeric unit corresponding to $C_{54}H_{109}Al_2O_{11}P_5$ is C—56.7%; H—9.60%; Al—4.72%.

Similarly, di-n-hexylphosphinic acid, n-octylphosphonic acid and aluminum hydride in a 4/1/2 molar ratio were reacted and produced a polymer having similar characteristics. This product was found to be crystalline both as prepared and after fusion. It melted at from about 230—355° C. Elemental analysis showed C—56.67%; H—10.78%; Al—4.35%. Calculated analysis for a polymer having repetitive units corresponding to the empirical formula $C_{56}H_{121}Al_2O_{11}P_5$ is C—55.29%; H—10.02%; Al—4.46%.

In a fourth preparation di-n-amylphosphinic acid, n-octylphosphonic acid and aluminum hydride, again in 4/1/2 molar ratio were reacted using the same procedure. The polymer obtained was a flexible material which melted at 320–375° C. After melting the product solidified into a wax-like material having a crystalline structure. Elemental analysis gave C—53.7%; H—9.82%; Al—4.23%; P—14.8%. Calculated for the polymer with a monomeric unit of empirical formula $C_{48}H_{99}Al_2O_{11}P_5$ is C—53.3%; H—9.75%; Al—4.20%; P—14.7%.

Various modifications can be made in the present invention without departing from the spirit or scope thereof for it is understood that we limit ourselves only as defined in the appended claims.

We claim:

1. A method of preparing an aluminum-oxygen-phosphorus linked inorganic polymer which comprises: reacting an aluminum source material with at least one of the members selected from the group consisting of phosphonic or phosphinic acids said reactants being present in proportions such that at least two equivalents of acid hydrogen are present for each equivalent of aluminum with the reaction being carried out at a maximum temperature of about room temperature, and separating a solid aluminum - oxygen - phosphorous linked inorganic polymeric product from the residual reaction mass, said aluminum source material being selected from the group consisting of aluminum alkyls or etherated aluminum hydrides, said aluminum hydrides corresponding to the general formula $AlH_{3-n}X_n$ and said aluminum alkyls corresponding to the general formula $AlR_{3-n}X_n$ where R is an aliphatic alkyl group having a carbon chain length of from about 1 to about 4, X is halogen, and $n$ is an integer having the value of 0, 1 or 2, and, wherein the phosphonic acid and phosphinic acid reactants correspond respectively to the formulas $R'OP(OH)_2$ and $R''R'''OPOH$ wherein R', R'' and R''' are aliphatic alkyl, aryl or alkaryl groups, the number of carbon atoms present in each of said groups being from 1 to about 12.

2. The process as defined in claim 1 wherein the reaction is carried out in an inert solvent at a maximum temperature of about minus 70° C.

3. The process as defined in claim 1 wherein the aluminum source material is a member selected from the group consisting of aluminum dihydrogen monohalide or aluminum dialkyl monohalide and the acid reactant is a phosphonic acid, said aluminum source material and phosphonic acid being reacted in about stoichiometric quantities to provide an aluminum-oxygen-prosphorus linked inorganic polymer having a monomeric unit corresponding to the formula:

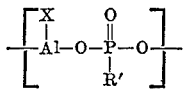

4. The process as defined in claim 1 wherein the aluminum source material is a member selected from the group consisting of monohalogen substituted aluminum hydride or aluminum alkyl, said aluminum source material being reacted with 2 molar equivalents of a phosphinic acid thereby to provide an aluminum-oxygen-phosphorus linked inorganic polymer having a monomeric unit corresponding to the formula:

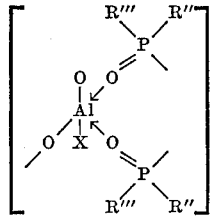

5. The process as defined in claim 1 wherein the aluminum source material is a member selected from the group consisting of non-substituted aluminum hydride or aluminum alkyls, said aluminum source material being reacted with 2 molar equivalents of a phosphinic acid and including the step of reacting the product mixture with a hydrogen halide thereby to prepare an aluminum-oxygen-phosphorus linked inorganc polymer having a monomeric unit corresponding to the formula:

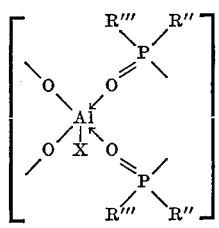

6. A polymer having a monomeric unit corresponding generally to the formula:

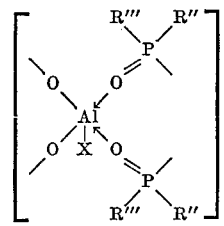

wherein X is a halogen and R'' and R''' are aliphatic alkyl, aryl and alkaryl groups having from 1 to about 12 carbon atoms.

7. A method comprising reacting aluminum hydride with three molar equivalents of a phosphinic acid, and separating a solid aluminum-oxygen phosphorus linked inorganic polymeric product from the residual reaction mass, said reaction being carried out at a maximum temperature of about room temperature with the phosphinic acid reactant corresponding to the formula $R''R'''OPOH$ wherein R'' and R''' are aliphatic, alkyl or alkaryl groups having from 1 to 12 carbon atoms in each of said groups, with the aluminum-oxygen-phosphorus linked inorganic polymer having a monomeric unit corresponding to the formula:

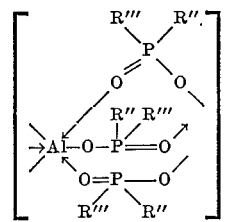

8. The process as defined in claim 1 wherein an aluminum source material is reacted with an equimolar quantity of a phosphorinic acid and the resulting product mixture treated with a phosphonic acid and the resulting reaction mass heated thereby to prepare a polymer having a monomeric unit corresponding to the formula:

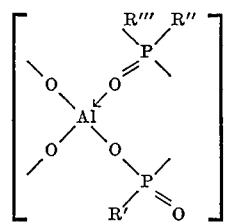

9. The process as defined in claim 3 and including the step of reacting the polymer product with a phosphinic acid and heating said product mixture thereby to produce a polymer having a monomeric unit corresponding to the formula:

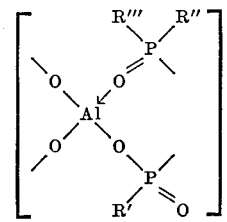

10. The process as defined in claim 1 wherein the aluminum source material is a member selected from the group consisting of aluminum monohydrogen dihalide or aluminum monoalkyl dihalide and said aluminum source material is reacted with a phosphinic acid thereby to produce an aluminum-oxygen-phosphorus linked inorganic polymer having a monomeric unit corresponding to the formula:

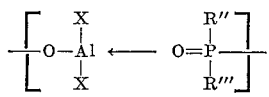

11. The process as defined in claim 1 wherein the aluminum source material is a member selected from the group consisting of aluminum hydride or aluminum trialkyl, said aluinum source material being reacted with a phosphinic acid and including the step of reacting the resulting product mixture with a minium of 2 molar equivalents of a hydrogen halide other than hydrogen fluoride thereby to prepare an aluminum-oxygen-phosphorus linked inorganic polymer having a monomeric unit corresponding to the formula:

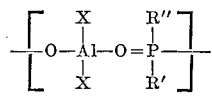

12. A polymer having a moneric unit corresponding generally to the formula:

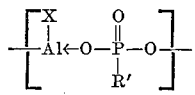

wherein X is a halogen other than fluorine, and R' is an aliphatic alkyl, aryl or alkaryl group having from 1 to about 12 carbon atoms.

References Cited

UNITED STATES PATENTS

| | | |
|---|---|---|
| 2,844,551 | 7/1958 | Orthner et al. |
| 3,055,925 | 9/1962 | Hartle _____ 260—448 XR |
| 3,186,966 | 6/1965 | Bamford _____ 260—46.5 |
| 3,197,436 | 7/1965 | Block. |
| 3,219,594 | 11/1965 | Bamford. |

FOREIGN PATENTS

| | | |
|---|---|---|
| 1,016,821 | 1/1966 | Great Britain. |
| 1,018,456 | 1/1966 | Great Britain. |

OTHER REFERENCES

Chemical Abstracts, vol. 59, p. 14175c (1963) (II).
Chemical Abstracts, vol. 60, p. 684a (1964) (I).
Coates et al.: J. of The Chemical Society, pp. 1295–1303 (1964).

HELEN M. McCARTHY, Primary Examiner

H. M. S. SNEED, Assistant Examiner

U.S. Cl. X.R.

117—121, 136; 260—2

UNITED STATES PATENT OFFICE
CERTIFICATE OF CORRECTION

PO-1050
(5/69)

Patent No. 3,538,136        Dated  3 November 1970

Inventor(s)  Donald L. Schmidt and Edward E. Flagg

It is certified that error appears in the above-identified patent and that said Letters Patent are hereby corrected as shown below:

In column 8, in the formula between lines 40 and 45, change "$C_4F_9$" to — $C_4H_9$ —; in the formula on line 75 change "$(C_6H_5)P$" to — $(C_6H_5)_2P$ —.

In column 10, insert the following between the last word in line 25 (mono-) and the first word in line 26 (following):

— meric unit with empirical formula $C_{32}H_{67}AlO_5P_2$ is C-61.91%; H-10.88%; Al-4.36%; P-9.98%.

Example 7 - Several Type II polymers were prepared —

In column 15, Claim 11, line 10, change "aluinum" to — aluminum — Change the formula between lines 16 and 20 to:

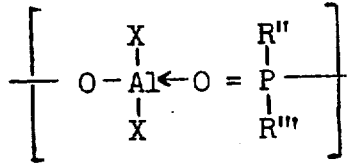

In Claim 12, line 21, change "moneric" to — monomeric —; change the formula between lines 22 and 27 to:

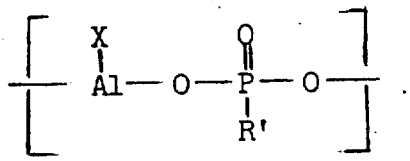

Signed and sealed this 20th day of April 1971.

(SEAL)
Attest:

EDWARD M. FLETCHER, JR.        WILLIAM E. SCHUYLER, JR
Attesting Officer                Commissioner of Patents